UNITED STATES PATENT OFFICE.

MOSES G. FARMER, OF SALEM, MASSACHUSETTS.

IMPROVEMENT IN INSULATORS FOR TELEGRAPHIC USES.

Specification forming part of Letters Patent No. 129,724, dated July 23, 1872.

SPECIFICATION.

*To all whom it may concern:*

Be it known that I, MOSES G. FARMER, of Salem, in the State of Massachusetts, have invented an Improvement in Glass Insulators for Telegraph-Wires; and I do hereby declare the following to be a full and correct description of the same.

In Letters Patent of the United States No. 124,201, granted me March 5, 1872, for an improvement in compounds for insulating telegraph-wires, &c., I gave instructions for the preparation of an insulating mixture and for applying the same to insulators. The same mixture may be advantageously applied to the ordinary glass insulator; but in hot weather and after a rain I find that the superficial coating is liable to be displaced.

The object of the present invention is to improve the glass insulator for the better reception of the compound described in my said patent, or of any similar compound used for a like purpose, and for the better retention of the mixture after application. This is done by roughening either the whole or a part of the surface of the glass insulator below the groove in which the wire is wound around the insulator. The glass should be about as rough as ordinary ground glass, and may be prepared by grinding upon a stone or emery wheel, or in any manner known to the arts. When thus roughened the glass insulator is immersed in the melted compound described in my said patent numbered 124,201, or in a similar compound, to receive a coating thereof.

By experiment I find, when applying the mixture to an insulator roughened in part, that after exposure to the weather for many weeks the coating cannot be easily removed from the roughened part, while from the part of the insulator remaining smooth it can be displaced by moderately pressing upon it with the finger. This experiment illustrates the value of my invention.

I claim—

1. A glass insulator having its surface below the groove roughened, in whole or in part, for the better reception and retention of an insulating compound, substantially as described.

2. A glass insulator having a roughened surface coated substantially as described.

The above specification of my said invention signed and witnessed at Boston this 12th day of June, 1872.

MOSES G. FARMER.

Witnesses:
    WILLIAM W. SWAN,
    CHAS. P. GORELY.